(12) United States Patent
Scudder et al.

(10) Patent No.: US 7,499,459 B1
(45) Date of Patent: Mar. 3, 2009

(54) PARTITIONED ROUTING INFORMATION BASE

(75) Inventors: John Galen Scudder, Ann Arbor, MI (US); David Delano Ward, Somerset, WI (US); Paul A. Jensen, Ann Arbor, MI (US)

(73) Assignee: Cisco Technology, Inc., San Jose, CA (US)

( * ) Notice: Subject to any disclaimer, the term of this patent is extended or adjusted under 35 U.S.C. 154(b) by 938 days.

(21) Appl. No.: 10/772,484

(22) Filed: Feb. 5, 2004

(51) Int. Cl.
*H04L 12/56* (2006.01)

(52) U.S. Cl. ........................... 370/400; 370/389

(58) Field of Classification Search ............... 370/389, 370/378, 238
See application file for complete search history.

(56) References Cited

U.S. PATENT DOCUMENTS

| | | | |
|---|---|---|---|
| 6,999,454 B1* | 2/2006 | Crump | 370/389 |
| 7,023,808 B2* | 4/2006 | Ball et al. | 370/238 |
| 7,054,311 B2* | 5/2006 | Norman et al. | 370/378 |
| 2005/0074001 A1* | 4/2005 | Mattes et al. | 370/389 |

* cited by examiner

*Primary Examiner*—Chi H Pham
*Assistant Examiner*—Albert T Chou
(74) *Attorney, Agent, or Firm*—Schwegman, Lundberg & Woessner, P.A.

(57) ABSTRACT

A system and method for routing in a network according to a routing protocol. In a router having a plurality of route processors, a routing information base (RIB) is partitioned so that it executes as processes on two or more of the plurality of route processors. A first routing protocol process executing on one or more of the route processes determines a route to a destination in a given network and stores the route in a routing information base (RIB) associated with the first routing protocol process. The first routing protocol process updates a global routing information base (gRIB) with the new route. A gRIB process associated with the gRIB then writes the route from the gRIB to the routing information base (RIB) associated with the second routing protocol process.

36 Claims, 4 Drawing Sheets

PARTITIONED ROUTING INFORMATION BASE

CROSS-REFERENCE TO RELATED APPLICATIONS

This application is related to U.S. patent application No. 10/293,180, entitled "SYSTEM AND METHOD FOR LOCAL PACKET TRANSPORT SERVICES WITHIN DISTRIBUTED ROUTERS", filed Nov. 12, 2002, to U.S. patent application No. 10/293,162, entitled "ROUTING SYSTEM AND METHOD FOR SYNCHRONIZING A ROUTING SYSTEM WITH PEERS AFTER FAILOVER", filed Nov. 12, 2002, and to U.S. patent application No. 10/660,380, entitled "SYSTEM AND METHOD FOR SHARING GLOBAL DATA WITHIN DISTRIBUTED COMPUTING SYSTEMS", filed Sep. 11, 2003, to U.S. patent application No. 10/667,797, entitled "DISTRIBUTED SOFTWARE ARCHITECTURE FOR IMPLEMENTING BGP", filed Oct. 2, 2003, and to U.S. patent application No. 10/743,973, entitled "SYSTEM AND METHOD FOR DISTRIBUTING ROUTE SELECTION IN AN IMPLEMENTATION OF A ROUTING PROTOCOL", filed Dec. 23, 2003, each of which is incorporated herein by reference.

BACKGROUND OF THE INVENTION

1. Field of the Invention

The present invention is related to computer networks, and more particularly to a system and method for partitioning a routing information base among two or more processors.

2. Background Information

A network protocol is a set of rules defining how nodes in a network interact with each other. A routing protocol is a network protocol whose purpose is to compute routes or paths through the network according to some algorithm, in order to enable routers in a network to forward data packets towards their destinations. The term "routing protocol" is also used to indicate software which implements a routing protocol; this is the sense in which we use the term.

A Routing Information Base (RIB) stores routes associated with one or more protocols. In one approach, the Routing Information Base (RIB) is implemented with a type of binary tree called a radix trie. Other data structures can be used as well.

In a traditional routing system, protocol-based RIBs download all or some of their routing information to a global RIB. To date, all RIBs have been stored on a single processor. Such an approach means that routing information can be retrieved from a single location. At the same time, however, the address space of the processor limits the total number of routes that can be stored. This limit places constraints on the number of connections that can be handled by a router. What is needed is a system and method of increasing the size of the routing information base beyond the address space limitations of individual processors.

This limitation also leaves the RIB processor bound. That is, even if the processor can address all possible routes, the computational power of the processor may be limited such that it is unable to perform operations on the routes, such as selection of the best route, or to serve the routes up in a timely manner. What is needed, therefore, is a system and method for distributing a routing information base across two or more processors.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

If we define network protocols as sets of rules defining how nodes in a network interact with each other, a routing protocol is a network protocol whose purpose is to compute routes or paths enabling routers in a network to forward packets towards their destinations. Routing protocols are used by routers to build tables used in determining path selection of routed protocols. Examples of these protocols include Interior Gateway Routing Protocol (IGRP), Enhanced Interior Gateway Routing Protocol (EIGRP), Open Shortest Path First (OSPF), Exterior Gateway Protocol (EGP), Border Gateway Protocol (BGP), Intermediate System-to-Intermediate System (IS-IS), and Routing Information Protocol (RIP).

Each "route" (or "path") computed by a routing protocol includes a prefix, next hop, and other, protocol-specific data. An IP prefix is the combination of an IP address and a mask that cooperate to describe an area of the network. A next hop specifies another ("peer") router to which packets should be sent in order to have them forwarded on to their destination (which is depicted by the prefix). The next hop may specify an interface (if the peer is directly reachable) or an IP address (if other routers must be traversed to reach the peer).

The traditional routing system includes a number of routing protocols and a global Routing Information Base (RIB) which stores routes associated with those protocols. Each routing protocol has a protocol-specific RIB; some or all of the routes stored in each protocol's protocol-specific RIB are downloaded to the global RIB. The global RIB can, therefore, become a superset of routing information.

As noted above, a limitation of such a routing system is that the number or routes stored in traditional routing systems can be no larger than the number of routes that will fit in the memory which can be addressed by the processor maintaining the RIB. In one embodiment, each routing protocol process is an instance of a routing protocol. An example is shown in FIG. 1.

Figure 1:
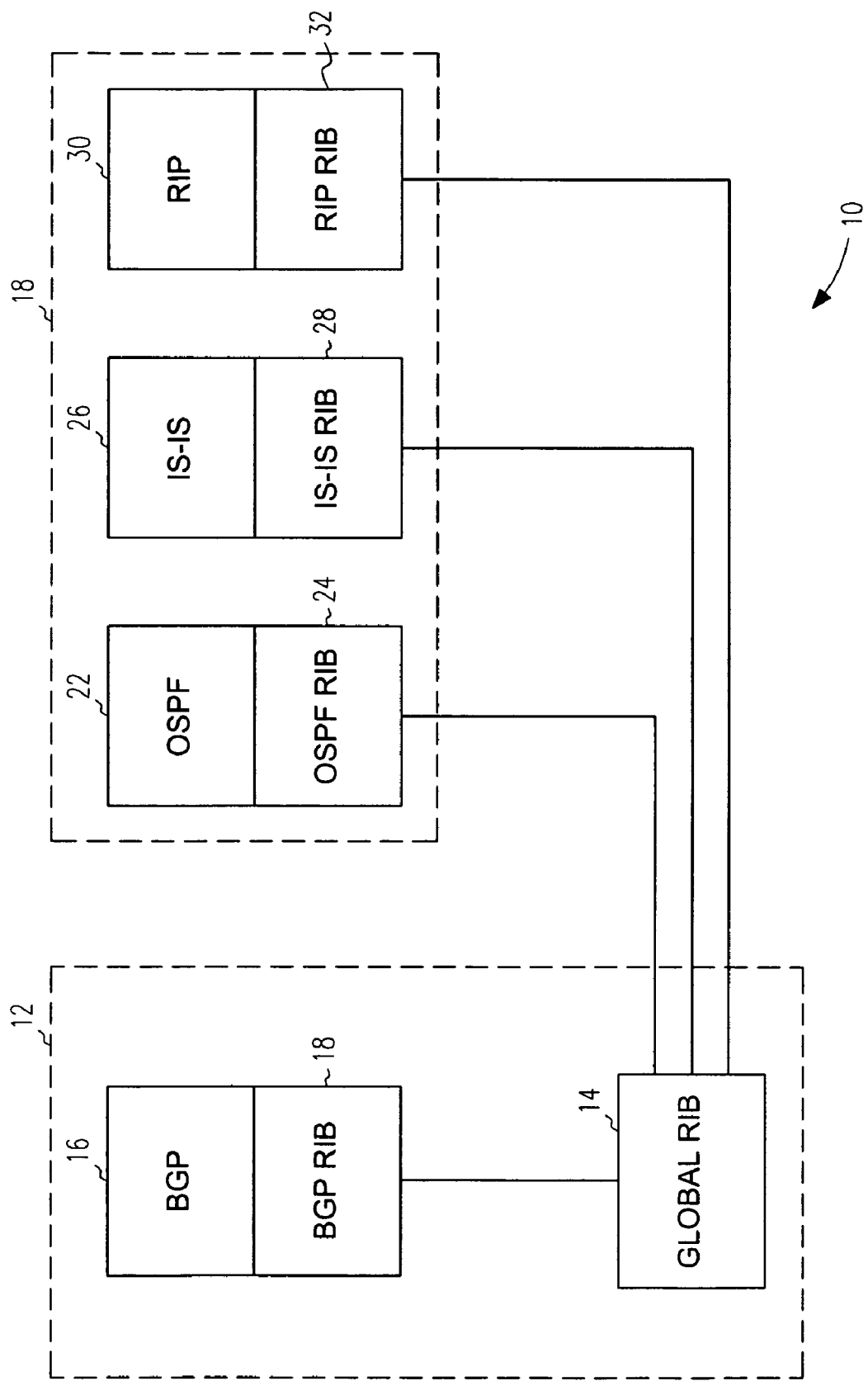
FIG. 1 illustrates a routing system according to the present invention.

In the example shown in FIG. 1, a routing system 10 includes two route processors (12, 18). Each route processor (12, 18) is a computer with CPU, memory, and one or more network connections. A BGP process 16, a BGP RIB server 18 and a global RIB (gRIB) process 14 execute on processor 12. A RIB server stores routes and their associated attributes for particular routing protocols, performs protocol-specific route selection, and updates gRIB process 14 with selected routes.

Global RIB process 14 stores routes from routing protocol processes, including prefix, next hop, and common attributes which can be distributed between protocols (such as metric) or from the protocols to the FIB (forwarding information base). A routing protocol process need not offer all of its routes to gRIB 14 for storage; in fact the protocol will most likely only offer its best route. That is, if a protocol has multiple routes available to reach a given destination, it will typically select some subset of those routes as "best". It does this according to some set of rules inherent in the protocol, using data associated with the routes. An example of "best route" selection would be to select the route with the lower-valued metric attribute. A method of selecting a best route is described in U.S. patent application No. 10/743,973, entitled "System and Method for Distributing Route Selection in an Implementation of a Routing Protocol," filed Dec. 23, 2003, the description of which is incorporated herein by reference.

The global RIB process also performs inter-protocol route selection. Given multiple competing routes to a given destination, the RIB selects the overall best route, according to predetermined or configured selection criteria (or route selection policies).

OSPF process 22, OSPF RIB server 24, IS-IS process 26, IS-IS RIB server 28, RIP process 30 and RIP RIB server 32 execute on processor 20. In another embodiment, OSPF process 22, OSPF RIB server 24, IS-IS process 26, IS-IS RIB server 28, RIP process 30 and RIP RIB server 32 are distributed across two or more route processors.

As noted above, global RIB server 14 accepts routes from routing protocol components. When multiple routes to the same destination exist, it selects the route which will be used, according to a route selection algorithm. It disseminates knowledge of the selected routes to routing protocol components and to the FIB. In one embodiment, once a route is submitted to the FIB, the FIB interface (or downloader) component stores a copy of the route and takes appropriate steps to convey the route to the line card FIBs as needed.

In one embodiment, the global RIB stores protocol-specific information, such as AS Path information.

In one embodiment, once a best route has been selected, gRIB 14 disseminates it to the routing protocol processes ("redistribution") and installs it to the Forwarding Information Base (FIB) (using, e.g., the FIB's API). In one embodiment, the global RIB applies policy control to the routes it distributes to any target, including the FIB.

If the gRIB process fails or restarts, the new gRIB table will be empty. The table then needs to be repopulated with routes. In one embodiment, state is recovered after a failure of a RIB process (or CPU) by requesting client processes to repopulate the RIB. Client processes may elect to store a copy of their routes locally for easy re-download, or they may recover the routes from the network.

Figure 2:
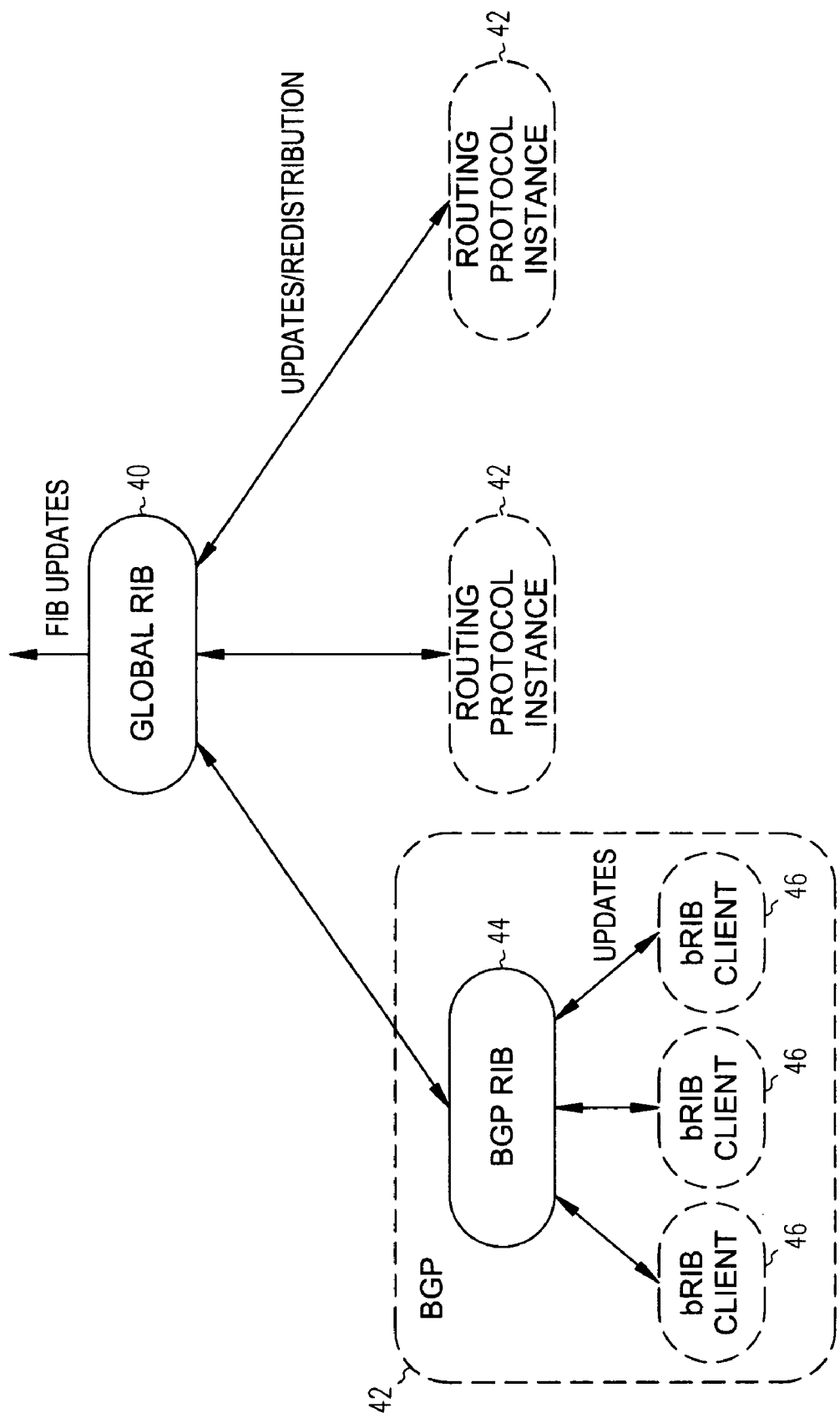
FIG. 2 illustrates a distributed routing information base (RIB) process according to the present invention.

In the embodiment shown in FIG. 2, a global RIB server 40 communicates with a plurality of routing protocol instances 42. Each protocol instance 42 includes a protocol process 44 communicating to one or more client processes 46. Each protocol process 44 is customized to reflect route selection rules peculiar to its associated protocol, and to allow storage of protocol-specific data (such as AS Path data for BGP).

In one embodiment, each protocol-specific RIB server provides storage of all routes from protocol processes and storage of protocol-specific data (such as AS Path data for BGP) as noted above. In addition, each protocol-specific RIB server performs protocol route selection according to the protocol's rules, installs the protocol's best route into global RIB 40, receives updates from global RIB 40 and may disseminate each updated route to client processes 46. That is, protocol RIB server 44 acts as an intermediary between global RIB 40 and client processes 46.

Finally, in one embodiment the RIB server provides recursive next hop resolution for the BGP protocol. In another embodiment, however, next hop resolution is a responsibility of global RIB 40 instead of the BGP process.

Each protocol-specific RIB server can scale up to the number of routes which can be stored in a single CPU's memory. If it becomes necessary to store a protocol RIB larger than a single CPU's memory, it will be necessary to distribute the protocol RIB, e.g. by segmenting it according to prefix range. The API should be designed such that this distribution can be done transparently to the client applications.

In one embodiment, protocol RIB server 42 executes on the same processor as global RIB 40. This approach is more efficient (all communications are local to the processor) as long as the route processor's processing and memory capacity is not exceeded.

Likewise, the global RIB can scale up to the number of routes which can be stored in a single CPU's memory. If it becomes necessary to store a global RIB larger than a single CPU's memory, it will be necessary to distribute the global RIB, as described below. The API should be designed such that this distribution can be done transparently to the client applications.

The technique of distributing, or partitioning, RIBs in order to overcome memory and CPU limitations will be discussed next.

Partitioning a RIB

If a protocol RIB or the global RIB 14 becomes larger than a single CPU's memory, it will be necessary to distribute that RIB. Likewise, if processor power beyond that provided by a single CPU is needed, it will be necessary to distribute the RIB. A routing system 10 with a partitioned global RIB 110 is shown in FIG. 3.

Figure 3:
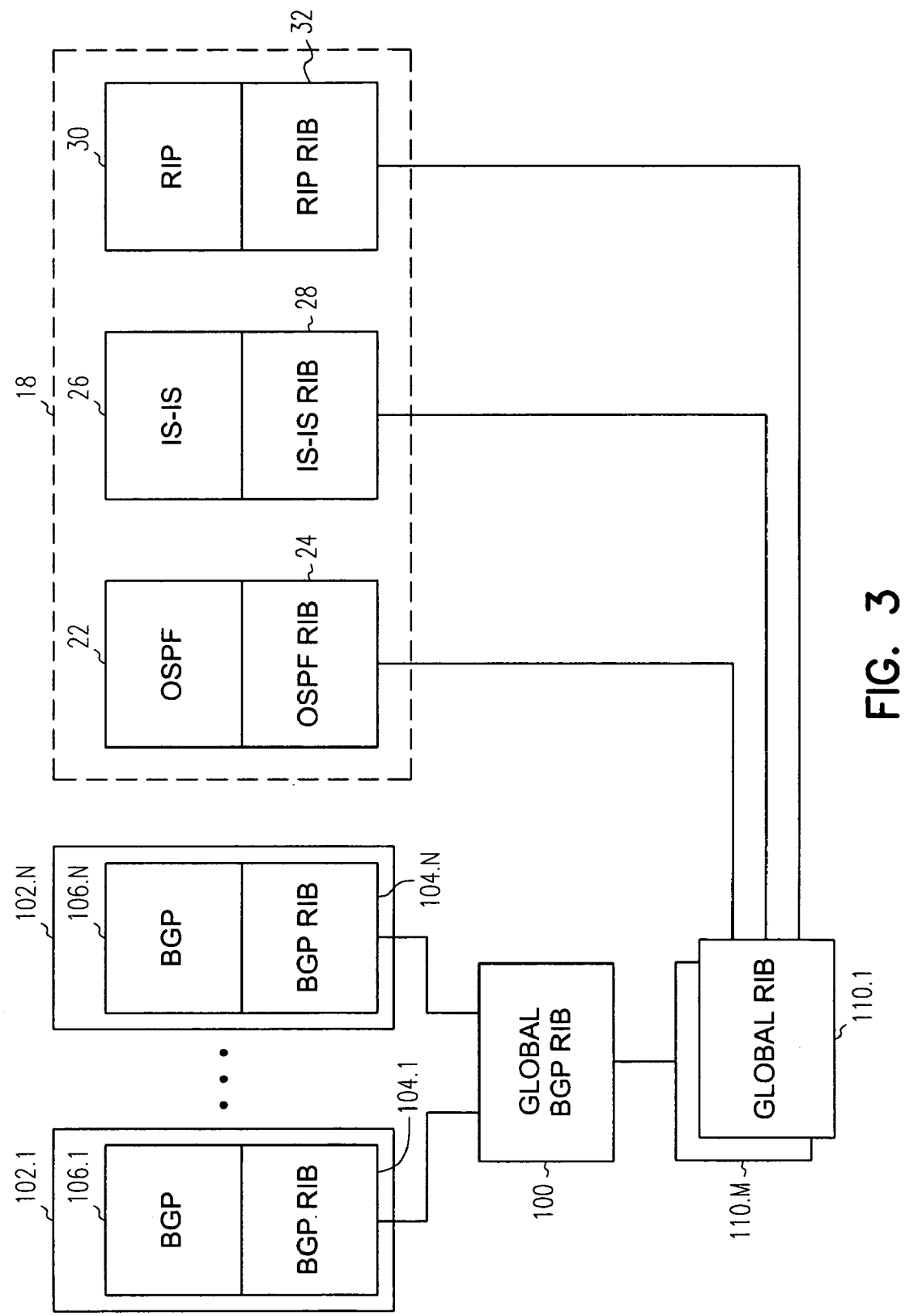
FIG. 3 illustrates a routing system having distributed BGP and global RIB processes according to the present invention.

In the routing system 10 of FIG. 3, global RIB 12 of FIG. 1 has been partitioned into M separate global RIB serves 110.1 through 111.M. The routing data could be partitioned in a number of ways. For instance, the data could be partitioned based on the client or on the prefix. Each approach has advantages and disadvantages. A partition based on prefix will be discussed next.

In one embodiment, global RIB server 14 is partitioned by prefix range into M separate global RIB servers 110. Such an approach provides good control over the size of the partitions, and a reasonably straightforward design for doing repartitioning. In addition, it is easy to maintain a directory for location of entries based on a simple lookup of the route prefix. For example, the global RIB server might be partitioned into two servers, one of which serves routes matching the prefix 0.0.0.0/1, the other matching the prefix 128.0.0.0/1. Of course, more elaborate prefix allocation schemes are possible and likely.

In one such embodiment, each server 110 includes a copy of a directory that maps prefix to partition. Whenever there are changes to the directory they must be replicated across all servers 110. Such an approach means that each server 110 can access only those servers 110 with data relevant to that prefix.

In contrast, in one prefix-partitioned embodiment the directory is not replicated. Instead, each server 110 contacts all other servers 110 when it receives a route having a prefix that it is not in control of. The server or servers 110 that have the information sought respond, or all respond and the requesting server 110 extracts the information from the one or more responses that are not empty responses.

In one embodiment, the directory is replicated at the client process, allowing the client process to directly contact the servers 110 involved in performing the requested operation.

In one embodiment, the API for configuring global RIB 14 is designed such that global RIB 14 can be distributed as described above in a manner transparent to the client applications.

Global RIB server 14 can be partitioned in other ways as well. For instance, it may be advantageous to partition global RIB server 14 as a series of virtual private networks.

In one embodiment, multiple RIB processes 110 execute in system 10 (each with identical functionality) to support different name spaces, such as for a network (VPN) or a virtual private router (VPR). In one such embodiment, support is provided for different name spaces by using separate routing tables, identified by a table id, within a process.

Figure 4:
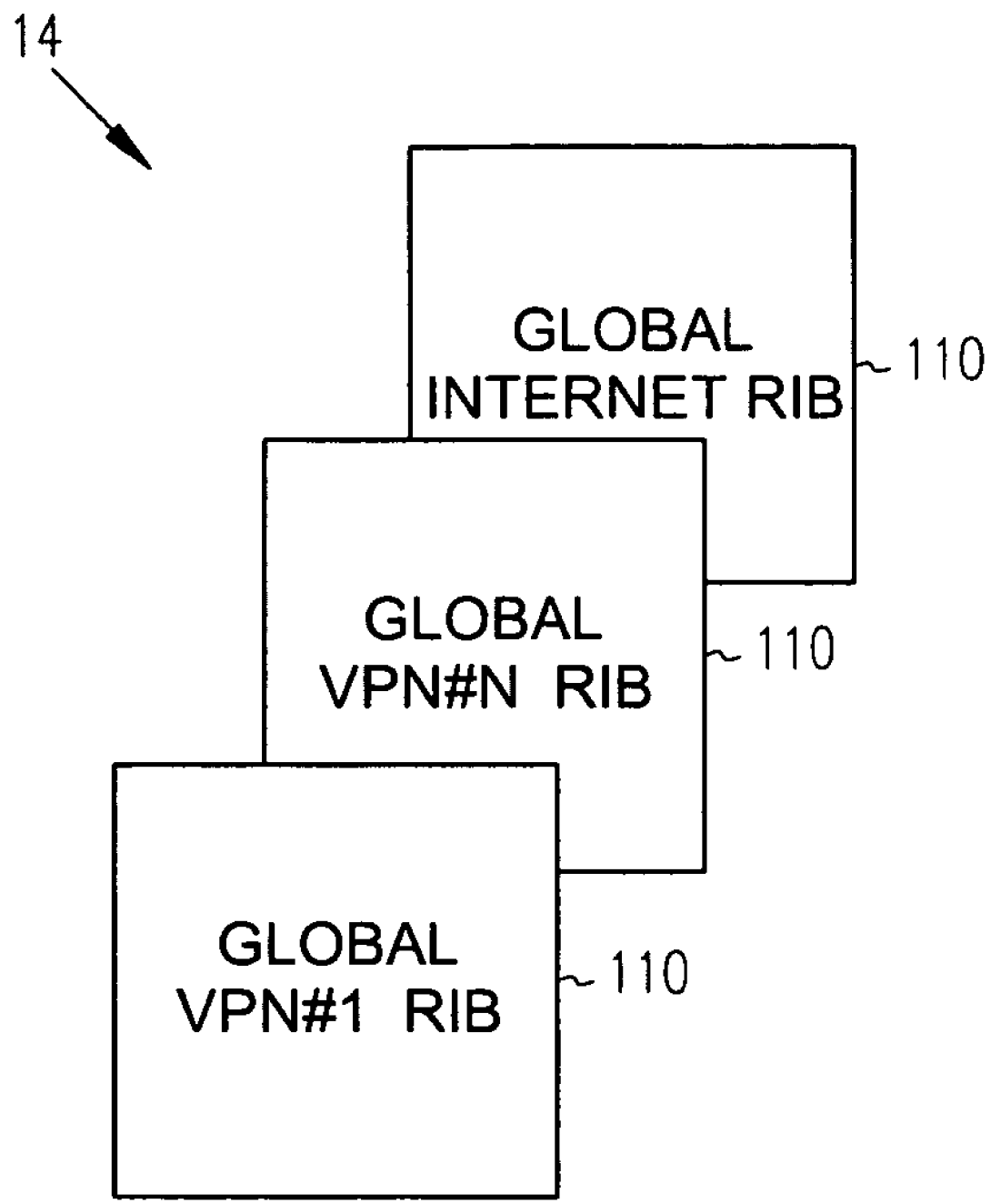
FIG. 4 illustrates a distributed global RIB process according to the present invention.

One example of a global RIB server 14 partitioned as a function of name space is shown in FIG. 4. In the example shown in FIG. 4, each global RIB server 14 is split into one Internet global RIB server 110 and N VPN global RIB servers 110. Each VPN global RIB server 110 corresponds to a different virtual private network, and the virtual private networks are layered on top of the Internet network maintained by the Internet Service Provider (ISP).

For instance, a corporate network with its own private addressing scheme could be layered on top of the ISP network. Although traffic travels across the ISP network, it's isolated from the other traffic in that each VPN has its own separate routing table, which is the key to keeping the networks isolated. In addition, the Internet global RIB server and the VPN global RIB servers can be configured to execute on separate processors in order to further separate the networks.

Although the foregoing discussion has focused on partitioning a global RIB, it will be recognized by one skilled in the art that the techniques described may be applied to partitioning a protocol RIB. For instance, the technique applied to partitioning the global RIB (by prefix range, VPN, etc) can equally be applied to a protocol RIB in order to achieve similar benefits, namely the ability to store more routes than can be supported in the memory of a single route processor and the ability to take advantage of the CPU resources of more than one route processor.

In one embodiment, a route processor seeking to read or write a route from the partitioned RIB accesses a directory to determine the portion of memory holding the route. In another embodiment, a route processor seeking to read or write a route from the partitioned RIB broadcasts a request to all possible holders of the route.

In the above discussion, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Portions of the above description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. In a routing system having a plurality of route processors, including a first and a second route processor, a method of determining a route to a destination in a network, the method comprising:

partitioning a global routing information base (gRIB) such that it executes as processes on two or more of the plurality of route processors;

establishing a first routing protocol process on one or more of the plurality of route processors;

establishing a second routing protocol process on one or more of the plurality of route processors;

determining, using the first routing protocol process, a route to a destination in a given network;

storing the route in a routing information base (RIB) associated with the first routing protocol process;

updating the gRIB with the route stored in the routing information base (RIB) associated with the first routing protocol process; and writing the route from the gRIB to the routing information base (RIB) associated with the second routing protocol process.

2. The method according to claim 1, wherein partitioning the gRIB such that it executes as processes on the first and second route processors includes storing, as a function of a prefix range, a first portion of the gRIB in memory of the first route processor and a second portion of the gRIB in memory of the second route processor.

3. The method according to claim 2, wherein partitioning the gRIB such that it executes as processes on two or more of the route processors further includes storing a directory of prefix ranges in memory of the route processors associated with each routing protocol process.

4. The method according to claim 1, wherein partitioning the gRIB such that it executes as processes on the first and second route processors includes storing all routes for a first virtual private network (VPN) in memory of the first route processor and all routes for a second VPN in memory of the second route processor.

5. The method according to claim 4, wherein partitioning the gRIB such that it executes as processes on two or more of the route processors includes storing a directory of VPNs in memory of the route processors associated with each routing protocol process.

6. An article comprising a computer readable medium having instructions thereon, wherein the instructions, when executed in a computer, create a system for executing the method of claim 1.

7. In a routing system having a plurality of route processors, including a first and a second route processor, a method of determining a route to a destination in a network, the method comprising:

partitioning a global routing information base (gRIB) such that it executes as processes on two or more route processors, wherein partitioning includes storing a first portion of the gRIB in memory of the first route processor and a second portion of the gRIB in memory of the second route processor;

establishing a routing protocol process on one or more of the plurality of route processors;

determining, using the routing protocol process, a route to a destination in a given network;

storing the route in a routing information base (RIB) associated with the routing protocol process; and updating the gRIB with the route stored in the routing information base (RIB) associated with the routing route process, wherein updating includes writing the route to one or more of the portions of the gRIB.

8. The method according to claim 7, wherein storing a first portion of the gRIB in memory of the first route processor and a second portion of the gRIB in memory of the second route processor includes partitioning the gRIB as a function of a prefix range.

9. The method according to claim 8, wherein partitioning the gRIB such that it executes as processes on two or more of the route processors further includes storing a directory of prefix ranges in memory of the route processors associated with the routing protocol process.

10. The method according to claim 7, wherein partitioning the gRIB further includes storing all routes for a first virtual private network (VPN) in memory of the first route processor and all routes for a second VPN in memory of the second route processor.

11. The method according to claim 10, wherein partitioning the gRIB such that it executes as processes on two or more of the route processors includes storing a directory of VPNs in memory of the route processors associated with each routing protocol process.

12. An article comprising a computer readable medium having instructions thereon, wherein the instructions, when executed in a computer, create a system for executing the method of claim 7.

13. In a routing system having a plurality of route processors, including a first and a second route processor, a method of determining a route to a destination in a network, the method comprising:

providing a routing protocol process and a routing protocol routing information base (RIB) associated with the routing protocol process;

partitioning a routing protocol process as a function of prefix range such that it executes as partitioned routing protocol processes on two or more route processors, wherein partitioning includes:

separating the routing protocol routing information base (RIB) associated with the routing protocol process into a first portion and a second portion, wherein separating is a function of the prefix range associated with a route;

storing the first portion of the routing protocol RIB in memory of the first route processor; and storing the second portion of the routing protocol RIB in memory of the second route processor;

establishing a global routing information base (RIB) process on one or more of the plurality of route processors;

determining, via one of the partitioned routing protocol processes, a new route to a destination in a given network;

storing the new route in one of the portions of the routing protocol RIB, wherein storing is a function of the prefix range associated with the new route;

determining if the gRIB should be updated with the new route; and if the gRIB should be updated with the new route, updating the gRIB with the new route.

14. The method according to claim 13, wherein establishing a global routing information base (RIB) process on one or more of the plurality of route processors includes storing a directory of prefix ranges in memory of the route processors associated with the global RIB process.

15. The method according to claim 14, wherein the method further includes storing a route from the gRIB to the routing protocol RIB, wherein storing includes accessing the directory of prefix ranges in memory of the route processors associated with the global RIB process.

16. The method according to claim 13, wherein the method further includes storing a route from the gRIB to the routing protocol RIB, wherein storing includes querying each partitioned routing protocol process to determine if it handles the route to be stored.

17. An article comprising a computer readable medium having instructions thereon, wherein the instructions, when executed in a computer, create a system for executing the method of claim 13.

18. In a routing system having a plurality of route processors, including a first and a second route processor, a method of determining a route to a destination in a network having a plurality of virtual private networks, the method comprising:

providing a routing protocol process and a routing protocol routing information base (RIB) associated with the routing protocol process;

partitioning a routing protocol process as a function of virtual private network (VPN) such that the routing protocol process executes as partitioned routing protocol processes on two or more route processors, wherein partitioning includes:

separating the routing protocol routing information base (RIB) associated with the routing protocol process into a first portion and a second portion, wherein separating is a function of the virtual private network associated with a route;

storing the first portion of the routing protocol RIB in memory of the first route processor; and storing the second portion of the routing protocol RIB in memory of the second route processor;

establishing a global routing information base (RIB) process on one or more of the plurality of route processors;

determining, via one of the partitioned routing protocol processes, a new route to a destination in a given network;

storing the new route in one of the portions of the routing protocol RIB, wherein storing is a function of the virtual private network associated with the new route;

determining if the gRIB should be updated with the new route; and if the gRIB should be updated with the new route, updating the gRIB with the new route.

19. The method according to claim 18, wherein establishing a global routing information base (RIB) process on one or more of the plurality of route processors includes storing a directory of VPNs in memory of the route processors associated with the global RIB process.

20. The method according to claim 19, wherein the method further includes storing a route from the gRIB to the routing protocol RIB, wherein storing includes accessing the directory of VPNs in memory of the route processors associated with the global RIB process.

21. The method according to claim 18, wherein the method further includes storing a route from the gRIB to the routing protocol RIB, wherein storing includes querying each partitioned routing protocol process to determine if it handles the route to be stored.

22. An article comprising a computer readable medium having instructions thereon, wherein the instructions, when executed in a computer, create a system for executing the method of claim 18.

23. A routing system for routing according to a routing protocol, the routing system comprising:

a plurality of route processors, including a first and a second route processor;

a global routing information base (gRIB) process executing on two or more of the plurality of route processors, wherein the gRIB process stores a portion of the gRIB in memory of the first route processor and a portion of the gRIB in memory of the second processor; and a routing protocol process executing on one or more of the route processors, wherein the routing protocol process applies a policy corresponding to the routing protocol to select routes according to rules of the routing protocol and downloads the selected routes to the global RIB process for storage in the gRIB.

24. The routing system according to claim 23, wherein the routing protocol process includes a directory of prefix ranges for identifying the portion of the gRIB containing a desired route.

25. The routing system of claim 23, wherein the global RIB process stores a portion of a global RIB in memory of the first route processor as a function of a prefix range and wherein the global RIB process stores a directory of prefix ranges in each route processor associated with the routing protocol process.

26. The routing system of claim 25, wherein the routing protocol process stores portions of a routing protocol RIB associated with the routing protocol process in memory of two or more route processors, wherein the portions are partitioned as a function of a second prefix range.

27. The routing system of claim 23, wherein the portion of the global RIB in memory of the first route processor includes all routes for a first VPN and wherein the portion of the global RIB in memory of the second route processor includes all routes for a second VPN.

28. The routing system of claim 23, wherein the routing protocol process stores portions of a routing protocol RIB associated with the routing protocol process in memory of two or more route processors, wherein the portions are partitioned as a function of a prefix range.

29. The routing system of claim 23, wherein the routing protocol process stores portions of a routing protocol RIB associated with the routing protocol process in memory of two or more route processors, wherein the portions are partitioned as a function of virtual private network (VPN).

30. A routing system capable of routing according to a first and a second routing protocol, the routing system comprising:

a plurality of route processors, including a first, a second and a third route processor;

a global routing information base (RIB) process executing on the first and second route processors, wherein the global RIB process stores a portion of a global RIB in memory of each of the first and second route processors;

a first routing protocol process executing on the third route processor, wherein the first routing protocol process applies a policy corresponding to the first routing protocol to select routes according to rules of the first routing protocol and downloads the selected routes to the global RIB process for storage in the global RIB; and a second routing protocol process executing on one or more of the plurality of route processors, wherein the second routing protocol process applies a policy corresponding to the second routing protocol to select routes according to rules of the second routing protocol and downloads the selected routes to the global RIB process for storage in the global RIB.

31. The routing system of claim 30, wherein the global RIB process stores a portion of a global RIB in memory of the first route processor as a function of a prefix range.

32. The routing system of claim 30, wherein the global process stores a portion of a global RIB in memory of the first route processor as a function of a prefix range and wherein the global RIB process stores a directory of prefix ranges in each of the first and second route processors.

33. The routing system of claim 32, wherein the routing protocol process stores portions of a routing protocol RIB associated with the routing protocol process in memory of two or more route processors, wherein the portions are partitioned as a function of a second prefix range.

34. The routing system of claim 30, wherein the portion of the global RIB in memory of the first route processor includes all routes for a first VPN and wherein the portion of the global RIB in memory of the second route processor includes all routes for a second VPN.

35. The routing system of claim 30, wherein the routing protocol process stores portions of a routing protocol RIB associated with the routing protocol process in memory of two or more route processors, wherein the portions are partitioned as a function of a prefix range.

36. The routing system of claim 30, wherein the routing protocol process stores portions of a routing protocol RIB associated with the routing protocol process in memory of two or more route processors, wherein the portions are partitioned as a function of virtual private network (VPN).

* * * * *

UNITED STATES PATENT AND TRADEMARK OFFICE
CERTIFICATE OF CORRECTION

PATENT NO. : 7,499,459 B1
APPLICATION NO. : 10/772484
DATED : March 3, 2009
INVENTOR(S) : Scudder et al.

Page 1 of 1

It is certified that error appears in the above-identified patent and that said Letters Patent is hereby corrected as shown below:

In column 2, line 56, delete "or" and insert -- of --, therefor.

In column 4, line 40, delete "serves" and insert -- servers --, therefor.

In column 4, line 41, delete "111.M." and insert -- 110.M. --, therefor.

In column 7, line 30, in Claim 7, delete "route" and insert -- protocol --, therefor.

In column 8, line 10, in Claim 13, delete "global routing information base (RIB)" and insert -- global routing information base (gRIB) --, therefor.

In column 9, line 9, in Claim 19, delete "global routing information base (RIB)" and insert -- global routing information base (gRIB) --, therefor.

In column 10, line 36, in Claim 32, before "process" insert -- RIB --.

Signed and Sealed this

Fifteenth Day of September, 2009

David J. Kappos
*Director of the United States Patent and Trademark Office*